United States Patent
Yan et al.

(10) Patent No.: US 11,970,661 B2
(45) Date of Patent: Apr. 30, 2024

(54) COMBINED CATALYTIC VISCOSITY REDUCING SYSTEM AND A USE OF THE COMBINED SYSTEM

(71) Applicant: YANGTZE UNIVERSITY, Jingzhou (CN)

(72) Inventors: Xuemin Yan, Jingzhou (CN); Peiyue Wu, Jingzhou (CN); Hao Li, Jingzhou (CN); Huan Yang, Jingzhou (CN); Zhaofei Ma, Jingzhou (CN); Zhongfu Cheng, Jingzhou (CN); Fei Deng, Jingzhou (CN)

(73) Assignee: YANGTZE UNIVERSITY, Jingzhou (CN)

( * ) Notice: Subject to any disclaimer, the term of this patent is extended or adjusted under 35 U.S.C. 154(b) by 76 days.

(21) Appl. No.: 17/830,368

(22) Filed: Jun. 2, 2022

(65) Prior Publication Data
US 2022/0380659 A1    Dec. 1, 2022

Related U.S. Application Data

(63) Continuation of application No. PCT/CN2021/110011, filed on Aug. 2, 2021.

(30) Foreign Application Priority Data

May 27, 2021    (CN) .......................... 202110587311.2

(51) Int. Cl.
*C09K 8/584* (2006.01)
*C09K 8/592* (2006.01)

(52) U.S. Cl.
CPC .............. *C09K 8/584* (2013.01); *C09K 8/592* (2013.01)

(58) Field of Classification Search
CPC ..................................................... C09K 8/592
See application file for complete search history.

(56) References Cited

U.S. PATENT DOCUMENTS

| | | | | |
|---|---|---|---|---|
| 9,944,842 | B2* | 4/2018 | Quintero | E21B 21/00 |
| 2004/0176626 | A1* | 9/2004 | Milstein | C07F 15/0046 |
| | | | | 556/136 |
| 2014/0045732 | A1 | 2/2014 | Mazyar | |
| 2014/0196896 | A1* | 7/2014 | Krumrine | E21B 33/14 |
| | | | | 166/57 |
| 2022/0379291 | A1* | 12/2022 | Yan | B01J 27/16 |

FOREIGN PATENT DOCUMENTS

| | | |
|---|---|---|
| CN | 101423754 A | 5/2009 |
| CN | 103421483 A | 12/2013 |
| CN | 103878024 A | 6/2014 |

* cited by examiner

*Primary Examiner* — Silvana C Runyan

(57) ABSTRACT

A combined catalytic viscosity reducing system includes a catalyst slug, a heat generating system slug, a gas injection slug, and a water-soluble viscosity reducing system slug. The catalyst slug includes 10%-15% of azacarbene iron, 15%-30% of tert-butyl hydroperoxide, 2%-5% of phosphoric acid, 2%-5% of hydrogen donor, and 0.5%-1% of emulsifier agent, and the others are solvent. The heat generating system slug includes 10%-30% of $NaNO_2$, 8%-25% of $NH_4Cl$, and 3%-10% of acid initiator, and the others are water, totaling 100%. The water-soluble viscosity reducing system slug, according to mass percentage, includes 0.2%-0.5% of surfactant and 2%-10% of alkali, and the others are water. The combined catalytic viscosity reducing system can effectively reduce viscosity without injecting steam, and the viscosity reduction rate can reach 96.5%.

6 Claims, 1 Drawing Sheet

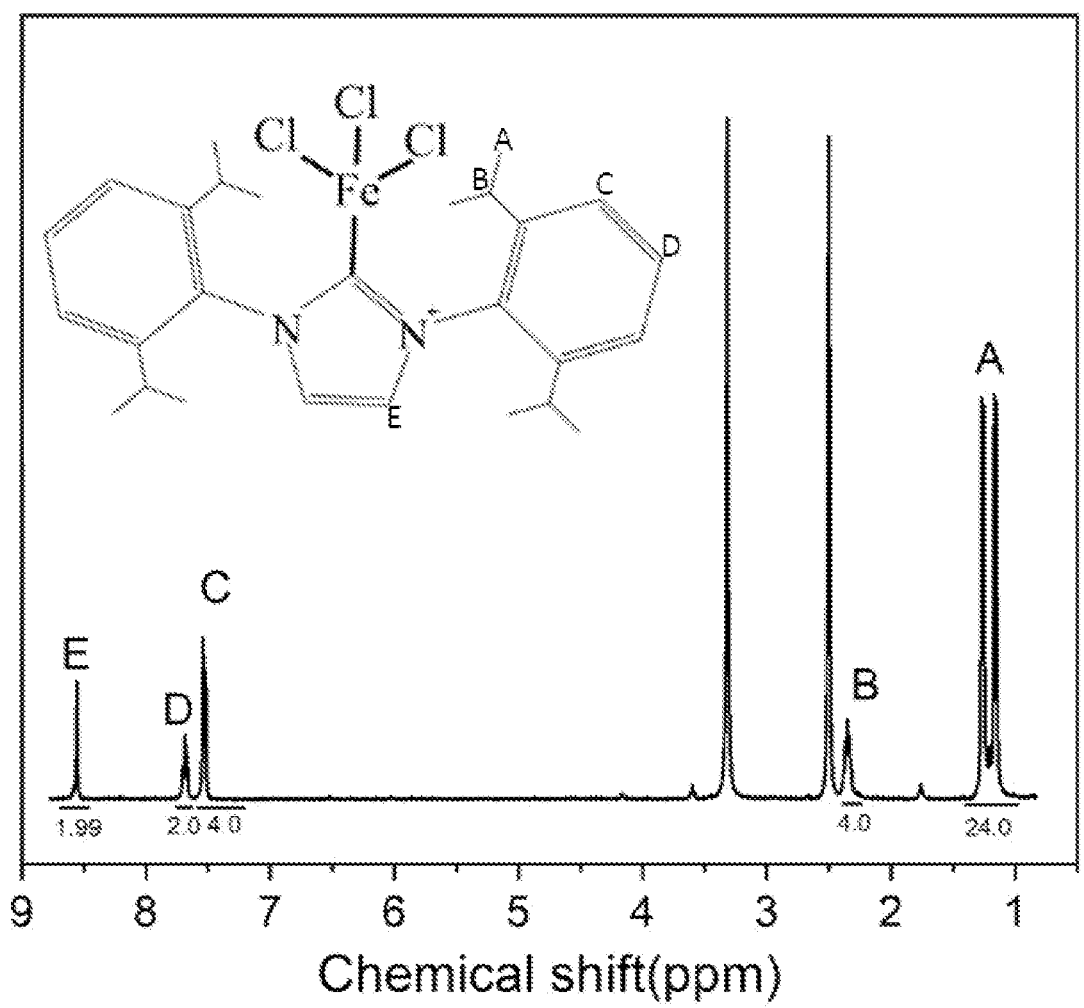

… (1)

COMBINED CATALYTIC VISCOSITY REDUCING SYSTEM AND A USE OF THE COMBINED SYSTEM

CROSS-REFERENCE TO RELATED APPLICATIONS

This application is a continuation of International Patent Application No. PCT/CN2021/110011, with an international filing date of Aug. 2, 2021, designating the United States, now pending, which is based on Chinese Patent Applications No. 2021105873112, filed on May 27, 2021. The contents of these specifications are incorporated herein by reference.

FIELD OF THE DISCLOSURE

The disclosure relates to the technical field of heavy oil extraction, in particular to a combined catalytic viscosity reducing system and a use of the combined system.

BACKGROUND

China has large reserves of heavy oil, but the exploitation of heavy oil is difficult. At present, physical methods are usually used in oil fields to reduce the viscosity of heavy oil and improve the ability of crude oil to migrate into production wells by means of heat, sound waves, magnetic force, or thin oil flooding. But the above methods usually require high energy consumption and huge water consumption. In recent years, chemical viscosity reduction technology has received more and more attention in the development of heavy oil reservoirs. The fluidity of heavy oil can be significantly improved by adding surfactants or alkalis to form water/oil or oil/water emulsions, but the effect is still limited for heavy oil with high viscosity in the formation. The aquathermolysis of heavy oil is a relatively mature catalytic viscosity reduction method. By adding a hydrothermal cracking catalyst, the viscosity of heavy crude oil can be irreversibly reduced with the assistance of high temperature steam, however, it is difficult to provide in the formation due to the high temperature required for the catalytic reaction. Therefore, the influence range of the catalyst is limited, especially for some wells with large depths, the heat loss when injecting steam into the formation is large, and it is difficult to reach the temperature required for hydrothermal cracking; at the same time, the fluidity of the catalyst in heavy oil and poor dispersibility, which is also an important factor affecting the effect of catalytic viscosity reduction.

How to improve the viscosity reduction efficiency of heavy oil without steam injection is a technical problem that needs to be solved urgently.

SUMMARY

The purpose of this disclosure is to overcome the above technical deficiencies and provide a combined catalytic viscosity reducing system and improve the viscosity reduction efficiency of heavy oil via the combined catalytic viscosity reducing system without steam injection.

For realizing above-mentioned technical purpose, the invention provides a kind of composite catalytic viscosity reducer and the purposes of composite catalytic viscosity reducer.

A combined catalytic viscosity reducing system, it contains four slugs. The first is catalyst slug, the second is heat generation system slug, the third is gas injection slug, and at last is about water-soluble viscosity reducing system slug; reducing system; heat generating system slug.

The catalyst slug, according to mass percentage, including 10%-15% of azacarbene iron, 15%-30% of tert-butyl hydroperoxide, 2%-5% of phosphoric acid, 2%-5% of hydrogen donor, and 0.5%-1% of emulsifier agent, and the others are solvent, totaling 100%;

The heat generation system slug, according to mass percentage, including 10%-30% of $NaNO_2$, 8%-25% of $NH_4Cl$, and 3%-10% of acid initiator, and the others are water, totaling 100%.

The water-soluble viscosity reducing system slug, according to mass percentage, including 0.2%-0.5% of surfactant and 2%-10% of alkali, the others are water, totaling 100%.

The beneficial effects of this disclosure include: the combined catalytic viscosity reducing system proposed by this disclosure is composed of four slugs, and the four slugs are catalyst slug, heat generation system slug, gas injection slug, and water-soluble viscosity reducing system slug; when degrading heavy oil, four slugs are injected in sequence, the heat generating system slug provides suitable temperature for catalytic degradation, the gas injection slug can adjust the pressure of the reaction system to 4-6 MPa, and the nitrogen heterocyclic carbene iron in the catalyst slug can effectively promote the water-soluble viscosity reducing system to reduce the viscosity of heavy oil with the assistance of other components. The viscosity reduction rate of heavy oil can be as high as 96.5% after 12 h.

BRIEF DESCRIPTION OF THE DRAWINGS

The accompanying figures are used to provide further explanation of the embodiments of the present invention. The accompanying figures are part of the present invention and serve to illustrate the principles of embodiments of the present invention and are accompanied by written descriptions. Apparently, the figures in the following description are only some embodiments of the present invention, and those skilled in the art can obtain other drawings according to these drawings without creative efforts.

FIG. 1 is the hydrogen nuclear magnetic resonance spectrum of the chemical structure of azacarbene iron in the embodiment of the present invention.

DETAILED DESCRIPTION OF PREFERRED EMBODIMENTS

A combined catalytic viscosity reducing system, it contains four slugs. The first is catalyst slug, the second is heat generation system slug, the third is gas injection slug, and at last is about water-soluble viscosity reducing system slug; heat generating system slug; the purpose of gas injection is to promote the mixing of heavy oil and improve the efficiency of viscosity reduction.

The oil-soluble metal catalyst is nitrogen heterocyclic carbene iron; the oil-soluble metal catalyst is nitrogen heterocyclic carbene iron.

The heat generation system slug, according to mass percentage, including 10%-30% of $NaNO_2$, 8%-25% of $NH_4Cl$, and 3%-10% of acid initiator, and the others are water, totaling 100%;

The water-soluble viscosity reducing system slug, according to mass percentage, including 0.2%-0.5% of surfactant and 2%-10% of alkali, the others are water, totaling 100%.

The catalyst slug is prepared according to the following steps: dissolving azacarbene iron and tert-butyl hydroperoxide in a solvent, then adding phosphoric acid, hydrogen donor, and emulsifier and mixing.

The gas injected into the gas injection slug is nitrogen or carbon dioxide.

The solvent is one or more of benzene, toluene, xylene, kerosene, and diesel oil; and/or, the hydrogen donor is one or more of methanol, ethanol, tetralin, formic acid, formamide, and glycerol; and/or, the emulsifier is one or both of Span 60 and Span 80.

The acid initiator is one or more of phosphoric acid, hydrochloric acid, sulfuric acid, and acetic acid.

The surfactant is alkylphenol polyoxyethylene ether.

The alkali is one or more of sodium hydroxide, potassium hydroxide, sodium carbonate, and potassium carbonate.

The structural formula of the azacarbene iron in this embodiment is as follows:

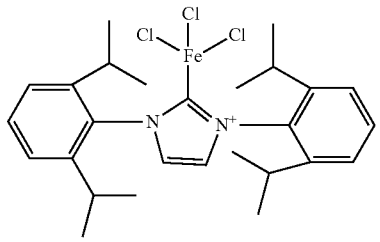

The azacarbene iron of this embodiment is obtained by the following steps:

Adding 2,6 diisopropylaniline, 40% glyoxal, and formic acid to a third organic solvent absolute ethanol to react for 2 d, filtering and washing with cold methanol to obtain the diazetadiene; wherein, the mol ratio of 2,6-diisopropylaniline and the glyoxal is 2:1; the yield of the diazetadiene is 89.2%;

Stirring polyformaldehyde and HCl (4M in dioxane) at 30° C. for 12 h, then adding the mixture of diazabutadiene and THF, and the reaction continued at room temperature for 4 h, then filtering and washing to obtain 1,3-bis (2,6-diisopropyl-1-phenyl) imidazole chloride. The molar ratio of the diazabutadiene, the paraformaldehyde, and the HCl is 1:1:1; the yield of 1,3-bis(2,6-diisopropyl-1-phenyl) imidazolium chloride was 88.4%;

The 1,3-bis (2,6-diisopropyl-1-phenyl) imidazolium chloride and potassium tert-butyl alcohol were mixed into the first organic solvent THF according to the molar ratio of 1:1, and stirred at room temperature for 4 h. The free nitrogen heterocyclic carbene was extracted, dried, and purified by ethyl acetate. The yield of free azacyclocarbene was 66.7%.

The free nitrogen heterocyclic carbene and anhydrous $FeCl_3$ were added to the second organic solvent THF according to the molar ratio of 1:1, stirred at room temperature for 30 min, vacuum dried, filtered and washed with a mixture of toluene and pentane, and then THF and pentane were used. The mixed solution was recrystallized to obtain an iron-based azacarbene catalyst, that is, iron azacarbene, and the yield of the iron-based azacarbene catalyst was 57.6%; in FIG. 1, the iron azacarbene $^1$H NMR (400 MHz, DMSO-d6) δ 8.56 (s, 2H), 7.69 (t, J=7.7 Hz, 2H), 7.53 (d, J=7.7 Hz, 4H), 2.35 (p, J=6.7 Hz, 4H), 1.21 (dd, J=41.3, 6.8 Hz, 24H).

The embodiment also includes a use of the above combined catalytic viscosity reducing system in degrading heavy oil.

The use of the combined catalytic viscosity reducing system comprises the following steps:

S1, adding the catalyst slug and water to heavy oil according to the mass ratio of water to the heavy oil (3-4):(6-7), and the consumption of the catalyst slug is 0.5 wt %-2 wt % of the heavy oil;

S2, continuing to add the heat generating system slug to the heavy oil at 50-60° C.; specifically, first dissolving $NaNO_2$ and $NH_4Cl$ in water and adding to the heavy oil, then adding acid initiator;

S3, continuing to inject gas into the heavy oil until the pressure reaches 4-6 MPa, and then adding the water-soluble viscosity reducing system slug to reduce viscosity for 2-4 hours.

In order to make the objectives, technical solutions, and advantages of this disclosure clearer, this disclosure will be further described in detail below with reference to the accompanying drawings and embodiments. It should be understood that the specific embodiments described herein are only used to explain this disclosure, but not to limit this disclosure.

It should be noted that the viscosity of the heavy oil treated in the following embodiments is 154100 mPa·s.

Embodiment 1

This embodiment proposes a combined catalytic viscosity reducing system, comprising four slugs, the four slugs are a catalyst slug, a heat generating system slug, a gas injection slug, and a water-soluble viscosity reducing system slug;

The catalyst slug, according to mass percentage, including: 15% of oil-soluble metal catalyst azacarbene iron, 15% of tert-butyl hydroperoxide, 5% of phosphoric acid, 3% of hydrogen donor methanol, and 1% of emulsifier agent Span 60, and the others are solvent benzene, totaling 100%;

The heat generating system slug, according to mass percentage, includes 27.6% of $NaNO_2$, 21.2% of $NH_4Cl$, and 3% of acid initiator hydrochloric acid, and the others are water, totaling 100%;

The water-soluble viscosity reducing system slug, according to mass percentage, includes 0.5% of surfactant alkylphenol polyoxyethylene ether and 2% of sodium hydroxide, and the others are water, totaling 100%.

This embodiment also includes the use of the above combined catalytic viscosity reducing system in degrading heavy oil, including the following steps:

S1, adding the catalyst slug and water to heavy oil according to the mass ratio of water to the heavy oil 4:6, and the consumption of the catalyst slug is 0.5 wt % of the heavy oil;

S2, continuing to add the heat generating system slug to the heavy oil at 60° C.; specifically, first dissolving $NaNO_2$ and $NH_4Cl$ in water and adding to the heavy oil, then adding acid initiator hydrochloric acid; the amount of heat generating system slug is 0.2% of the mass of heavy oil;

S3, continuing to inject nitrogen into the heavy oil until the pressure reaches 5 MPa, and then adding the water-soluble viscosity reducing system slug to reduce viscosity for 2 hours; the amount of water-soluble viscosity reducing system is 0.4 wt % of heavy oil.

Embodiment 2

This embodiment proposes a combined catalytic viscosity reducing system, comprising four slugs, the four slugs are a catalyst slug, a heat generating system slug, a gas injection slug, and a water-soluble viscosity reducing system slug;

The catalyst slug, according to mass percentage, including: 10% of oil-soluble metal catalyst azacarbene iron, 30% of tert-butyl hydroperoxide, 3% of phosphoric acid, 2% of hydrogen donor methanol, and 0.8% of emulsifier agent Span 80, and the others are solvent benzene, totaling 100%;

The heat generating system slug, according to mass percentage, includes 10% of $NaNO_2$, 25% of $NH_4Cl$, and 10% of acid initiator phosphoric acid, and the others are water, totaling 100%;

The water-soluble viscosity reducing system slug, according to mass percentage, includes 0.2% of surfactant alkylphenol polyoxyethylene ether and 5% of sodium hydroxide, and the others are water, totaling 100%.

This embodiment also includes the use of the above combined catalytic viscosity reducing system in degrading heavy oil, including the following steps:

S1, adding the catalyst slug and water to heavy oil according to the mass ratio of water to the heavy oil 3:7, and the consumption of the catalyst slug is 0.5 wt % of the heavy oil;

S2, continuing to add the heat generating system slug to the heavy oil at 50° C.; specifically, first dissolving $NaNO_2$ and $NH_4Cl$ in water and adding to the heavy oil, then adding acid initiator hydrochloric acid; the amount of heat generating system slug is 0.3% of the mass of heavy oil;

S3, continuing to inject nitrogen into the heavy oil until the pressure reaches 6 MPa, and then adding the water-soluble viscosity reducing system slug to reduce viscosity for 4 hours; the amount of water-soluble viscosity reducing system is 0.5 wt % of heavy oil.

Embodiment 3

This embodiment proposes a combined catalytic viscosity reducing system, comprising four slugs, the four slugs are a catalyst slug, a heat generating system slug, a gas injection slug, and a water-soluble viscosity reducing system slug;

The catalyst slug, according to mass percentage, including: 12% of oil-soluble metal catalyst azacarbene iron, 20% of tert-butyl hydroperoxide, 2% of phosphoric acid, 5% of hydrogen donor methanol, and 0.5% of emulsifier agent Span 60, and the others are solvent xylene, totaling 100%;

The heat generating system slug, according to mass percentage, includes 30% of $NaNO_2$, 18% of $NH_4Cl$, and 5% of acid initiator sulfuric acid, and the others are water, totaling 100%;

The water-soluble viscosity reducing system slug, according to mass percentage, includes 0.3% of surfactant alkylphenol polyoxyethylene ether and 10% of sodium hydroxide, and the others are water, totaling 100%.

This embodiment also includes the use of the above combined catalytic viscosity reducing system in degrading heavy oil, including the following steps:

S1, adding the catalyst slug and water to heavy oil according to the mass ratio of water to the heavy oil 4:6, and the consumption of the catalyst slug is 1 wt % of the heavy oil;

S2, continuing to add the heat generating system slug to the heavy oil at 60° C.; specifically, first dissolving $NaNO_2$ and $NH_4Cl$ in water and adding to the heavy oil, then adding acid initiator hydrochloric acid; the amount of heat generating system slug is 0.1% of the mass of heavy oil;

S3, continuing to inject nitrogen into the heavy oil until the pressure reaches 4 MPa, and then adding the water-soluble viscosity reducing system slug to reduce viscosity for 3 hours; the amount of water-soluble viscosity reducing system is 0.4 wt % of heavy oil.

Embodiment 4

This embodiment proposes a combined catalytic viscosity reducing system, comprising four slugs, the four slugs are a catalyst slug, a heat generating system slug, a gas injection slug, and a water-soluble viscosity reducing system slug;

The catalyst slug, according to mass percentage, including: 10% of oil-soluble metal catalyst azacarbene iron, 30% of tert-butyl hydroperoxide, 4% of phosphoric acid, 4% of hydrogen donor methanol, and 1% of emulsifier agent Span 60, and the others are solvent benzene, totaling 100%;

The heat generating system slug, according to mass percentage, includes 15% of $NaNO_2$, 22% of $NH_4Cl$, and 8% of acid initiator hydrochloric acid, and the others are water, totaling 100%;

The water-soluble viscosity reducing system slug, according to mass percentage, includes 0.3% of surfactant alkylphenol polyoxyethylene ether and 3% of sodium hydroxide, and the others are water, totaling 100%.

This embodiment also includes the use of the above combined catalytic viscosity reducing system in degrading heavy oil, including the following steps:

S1, adding the catalyst slug and water to heavy oil according to the mass ratio of water to the heavy oil 3:7, and the consumption of the catalyst slug is 0.7 wt % of the heavy oil;

S2, continuing to add the heat generating system slug to the heavy oil at 60° C.; specifically, first dissolving $NaNO_2$ and $NH_4Cl$ in water and adding to the heavy oil, then adding acid initiator hydrochloric acid; the amount of heat generating system slug is 0.6% of the mass of heavy oil;

S3, continuing to inject nitrogen into the heavy oil until the pressure reaches 5 MPa, and then adding the water-soluble viscosity reducing system slug to reduce viscosity for 3 hours; the amount of water-soluble viscosity reducing system is 0.4 wt % of heavy oil.

Embodiment 5

The difference between this embodiment and Embodiment 1 is that the amount of the catalyst slug used is 1.5% of the mass of the heavy oil.

Embodiment 6

The difference between this embodiment and Embodiment 1 is that the amount of the catalyst slug used is 2% of the mass of the heavy oil.

Embodiment 7

This embodiment adopts the combined catalytic viscosity reducing system in Embodiment 1, and the difference from Embodiment 1 is the use of the combined catalytic viscosity reducing system in degrading heavy oil, in step S1, water was added to the heavy oil according to the mass ratio of water to the heavy oil of 7:3, and the other steps were the same as those in Embodiment 1.

Comparative Embodiment 1

The difference between the combined catalytic viscosity reducing system of this comparative embodiment and Embodiment 1 is that the oil-soluble metal catalyst is 10% iron oleate, and other components are the same as those of Embodiment 1; in addition, the use in degrading heavy oil is the same as that of Embodiment 1.

Table 1 shows the viscosity reduction effects of Embodiments 1-7 and Comparative Embodiment 1.

The formula for calculating the viscosity reduction rate is $\Delta\eta$ (%)=(($\eta0-\eta$)/$\eta0$)×100%, where $\eta0$ and $\eta$ refer to the oil viscosity before and after the reaction, respectively, and the unit is mPa·s.

TABLE 1

Viscosity reduction results of Embodiments 1-7 and Comparative embodiment 1

|  | Viscosity reduction rate |
|---|---|
| Embodiment 1 | 96.5% |
| Embodiment 2 | 91.3% |
| Embodiment 3 | 92.6% |
| Embodiment 4 | 93.2% |
| Embodiment 5 | 94.6% |
| Embodiment 6 | 94.8% |
| Embodiment 7 | 92.5% |
| Comparative Embodiment 1 | 60.8% |

In Embodiment 1, after viscosity reduction, the final viscosity reduction rate of heavy oil with the viscosity of 154100 mPa·s is 96.5%, the crude oil is rapidly dispersed, dispersed in broken particles, the resin content is greatly reduced, and the aromatic hydrocarbon content is greatly increased.

The viscosity reduction rate of Embodiment 2 after 4 h of viscosity reduction was lower than that of Embodiment 1, which may be due to the fact that aromatics and resins were prone to condensation under aerobic conditions to produce asphaltenes, and the side chains of resin ring molecules were unstable, which was prone to fracture under certain condition. Due to the decarboxylation reaction to generate corresponding small molecular hydrocarbon substances, the content of saturated fractions will increase, but the continued extension of time will lead to the continued oxidation of saturated fractions to macromolecular substances such as glial asphaltene, and the viscosity reduction rate of heavy oil will decrease.

The reason for the low viscosity reduction rate of Embodiment 3 may be that the addition of emulsifier is less, the dispersed particles of crude oil are larger, and therefore the viscosity reduction effect is poor.

The reason why the viscosity reduction rate of Embodiment 4 is lower than that of Embodiment 1 may be that the addition amount of the heat generating system slug increases, and the temperature increase rate increases. Because in a limited space, as the reaction proceeds, the oxidation reaction of crude oil approaches the limit, and the asphaltene content increases, which will polymerize to produce coke and other substances, leading to a decrease in the viscosity reduction rate.

From Embodiment 5 and Embodiment 6, it can be seen that the relative increase of catalyst has little effect on viscosity reduction rate of heavy oil.

The viscosity reduction rate of Embodiment 7 is relatively low, indicating that an increase of water content will lead to a decrease in the viscosity reduction rate of heavy oil. This is because when the water content increases, an oil-in-water state will be formed, and a layer of polarity will be formed on the surface of the heavy oil molecules. The water molecule film can inhibit or slow down the partial oxidation reaction.

From the viscosity reduction results of Comparative embodiment 1, it can be seen that when the oil-soluble metal catalyst iron oleate is used, the viscosity reduction rate is only 60.8%.

The combined catalytic viscosity reducing system proposed in this disclosure integrates catalytic oxidation, chemical viscosity reduction, autogenous heat generation, and gas injection. It has good catalytic oxidation performance at low temperature for ordinary heavy oil, extra heavy oil, super heavy oil, and offshore heavy oil samples, and can be applied to the old heavy oil area, offshore, and difficult-to-use heavy oil reservoirs after steam injection thermal recovery. Compared with the catalytic viscosity reduction by hydrothermal pyrolysis, this disclosure can reduce heat consumption, save the cost, increase the saturation component in the reaction products and reduce the glial component in heavy oil.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A combined catalytic viscosity reducing system, comprising four slugs, the four slugs are a catalyst slug, a heat generating system slug, a gas injection slug, and a water-soluble viscosity reducing system slug;
    the catalyst slug, according to mass percentage, including: 10%-15% of azacarbene iron, 15%-30% of tert-butyl hydroperoxide, 2%-5% of phosphoric acid, 2%-5% of hydrogen donor, and 0.5%-1% of emulsifier agent, and others are solvent, totaling 100%;
    the heat generating system slug, according to mass percentage, includes 10%-30% of $NaNO_2$, 8%-25% of $NH_4Cl$, and 3%-10% of acid initiator, and others are water, totaling 100%;
    the water-soluble viscosity reducing system slug, according to mass percentage, includes 0.2%-0.5% of surfactant and 2%-10% of alkali, and others are water, totaling 100%.

2. The combined catalytic viscosity reducing system according to claim 1, wherein the catalyst slug is prepared according to following steps: dissolving azacarbene iron and tert-butyl hydroperoxide in a solvent, then adding phosphoric acid, hydrogen donor, and emulsifier and mixing.

3. The combined catalytic viscosity reducing system according to claim 1, wherein gas injected into the gas injection slug is nitrogen or carbon dioxide.

4. The combined catalytic viscosity reducing system according to claim 1, wherein the solvent is one or more of benzene, toluene, xylene, kerosene, and diesel oil; the hydrogen donor is one or more of methanol, ethanol, tetralin, formic acid, formamide, and glycerol.

5. The combined catalytic viscosity reducing system according to claim 1, wherein the acid initiator is one or more of phosphoric acid, hydrochloric acid, sulfuric acid, and acetic acid.

6. The combined catalytic viscosity reducing system according to claim 1, wherein the surfactant is alkylphenol polyoxyethylene ether.

\* \* \* \* \*